United States Patent
Chung et al.

(10) Patent No.: US 8,169,586 B2
(45) Date of Patent: May 1, 2012

(54) LIQUID CRYSTAL DISPLAY PANEL AND LIQUID CRYSTAL DISPLAY

(75) Inventors: Te-Chen Chung, Kunshan (CN); Tean-Sen Jen, Kunshan (CN); Chia-Te Liao, Kunshan (CN)

(73) Assignee: Infovision Optoelectronics (Kunshan) Co., Ltd., Kunshan, Jiangsu (CN)

(*) Notice: Subject to any disclaimer, the term of this patent is extended or adjusted under 35 U.S.C. 154(b) by 583 days.

(21) Appl. No.: 12/175,852

(22) Filed: Jul. 18, 2008

(65) Prior Publication Data

US 2009/0168007 A1 Jul. 2, 2009

(30) Foreign Application Priority Data

Dec. 29, 2007 (CN) .......................... 2007 1 0307873

(51) Int. Cl.
*G02F 1/1339* (2006.01)
(52) U.S. Cl. .................. 349/156; 349/155; 349/157
(58) Field of Classification Search ........... 349/155–157
See application file for complete search history.

(56) References Cited

U.S. PATENT DOCUMENTS

| 7,609,357 | B2 | 10/2009 | Kim | |
|---|---|---|---|---|
| 2005/0140914 | A1* | 6/2005 | Sawasaki et al. | 349/155 |
| 2005/0243261 | A1 | 11/2005 | Chiang et al. | |
| 2006/0103803 | A1* | 5/2006 | Jeon et al. | 349/155 |
| 2007/0153215 | A1 | 7/2007 | Lee | |
| 2007/0263162 | A1* | 11/2007 | Kang et al. | 349/155 |
| 2009/0046239 | A1* | 2/2009 | Watanabe | 349/157 |

FOREIGN PATENT DOCUMENTS

| CN | 1854820 A | 11/2006 |
|---|---|---|
| CN | 101071210 A | 11/2007 |
| CN | 101071220 A | 11/2007 |
| CN | 201007770 Y | 1/2008 |
| JP | 2003279998 A | 10/2003 |

OTHER PUBLICATIONS

Chinese Patent Application No. 200710307873.7; First Office Action dated Jun. 5, 2009; 5 pages.

* cited by examiner

*Primary Examiner* — Wen-Ying P Chen
(74) *Attorney, Agent, or Firm* — Whyte Hirschboeck Dudek S.C.

(57) ABSTRACT

A liquid crystal display panel is disclosed, including: a first substrate; a second substrate opposite to the first substrate; a plurality of first, second and third spacers disposed between the first substrate and the second substrate, the distribution density of the first spacers being larger than that of the second spacers and the distribution density of the third spacers being larger than that of the first spacers. The liquid crystal display panel can effectively reduce image display defects caused by the gravity mura, the press mura and the push mura.

11 Claims, 13 Drawing Sheets

LIQUID CRYSTAL DISPLAY PANEL AND LIQUID CRYSTAL DISPLAY

FIELD OF THE INVENTION

The present invention relates to a field of liquid crystal display technology, and in particular to a liquid crystal display panel with spacers.

BACKGROUND OF THE INVENTION

A liquid crystal display device can display an image by means of optical anisotropy and dual-refraction of liquid crystal molecules. In a display panel of the liquid crystal display device, two transparent insulation substrates are opposite to each other, and electrodes for generating an electric field are formed on the substrates opposite to each other, and liquid crystal are injected between the two substrates. Subsequently, a voltage is applied to the electrodes on the substrates so as to generate an electric field for changing arrangement direction of liquid crystal molecules. Thus, the amount of light transmitted through the transparent insulation substrates can be controlled, and desired images to be displayed can be obtained. Generally, because the liquid crystal display device with the above structure includes thin film transistors (TFTs) as switches, it is also referred to as thin film transistor liquid crystal display (TFT-LCD).

FIG. 1 shows a perspective diagram of a conventional liquid crystal display panel. As illustrated in FIG. 1, the liquid crystal display panel in the liquid crystal display device includes an upper substrate 50 and a lower substrate 70 adhered to each other by means of a frame adhesive (not shown). There is a predetermined space between the upper substrate 50 and the lower substrate 70. The liquid crystal layer 60 is injected into the space. A plurality of scanning lines 73 and a plurality of data lines 72 are disposed on a transparent glass substrate 71 of the lower substrate 70. The plurality of scanning lines 73 are arranged along one direction with a predetermined distance, and the plurality of data lines 72 are arranged along a direction perpendicular to the scanning lines 73, so that the pixel region (pixel) 75 is defined. The pixel electrode 74 is formed on the pixel region 75. Thin film transistors (TFTs) Q are formed at intercross locations of the scanning lines 73 and the date lines 72. The TFT applies a data signal of data lines 72 to the pixel electrode 74 through a scanning signal applied from scanning lines 73.

A black matrix layer 52 for shielding the light outside the pixel region 75, which is also referred to as a black bottom layer, is formed on the transparent glass substrate 51 of the upper substrate 50. Red (R), green (G) and blue (B) color filter layers for different colors are formed on a region of the upper substrate corresponding to the pixel region. A common electrode layer 54 is formed on the color filter layer 53 for driving the liquid crystal to display images.

In order to inject the liquid crystal between the upper substrate and the lower substrate, a supporter is configured between the upper substrate and the lower substrate to provide a required cell gap. The supporter is generally referred to as a spacer and is disposed above the data lines and the scanning lines to only provide a space to prevent the upper substrate and the lower substrate from contacting, without influence on the image displaying. The material of the spacer commonly includes a photosensitive resin such as acrylic resin. The shape of the spacer may be spheroid, column and trapezoid formed by the photolithography process. FIG. 2 is a planar schematic diagram of a liquid crystal display panel illustrating arrangement of a spacer. As illustrated in FIG. 2, data lines 11, scanning lines 12 and TFT including an active layer 13, a source electrode 14 and a drain electrode 15 are disposed within a region defined by the black matrix layer 25. The drain electrode 15 is connected to a pixel electrode 10 via a through hole 16 and a spacer 30 is formed above the scanning lines 12. FIG. 2a is a cross-sectional diagram of the spacer of FIG. 2 taken along line A-A'. As illustrated in FIG. 2a, the scanning lines 12 are formed on a glass substrate 1 of the lower substrate. A gate insulation layer 3 and a passivation layer 4 are formed in sequence on the glass substrate 1 and the scanning lines 12. The black matrix layer 25 and a light color filter layer 21 are formed on a glass substrate 2 of the upper substrate, and the spacer 30 is formed on a common electrode. A pixel electrode 10 is formed on the passivation layer 4 and corresponds to a position of the light color filter layer 21. The height of the spacer 30 is suitable for contacting with the passivation layer 4, after the upper substrate and the lower substrate are adhered by the frame adhesive.

However, in the case of that an external force in a transverse or an oblique direction is applied to the liquid crystal display panel, as illustrated in FIG. 2b, the spacer 30 is offset and can not return to its original position. In particular, when the distribution density of the spacers 30 is large, it is more difficult to make all the spacers return to their original position. Thus, the so-called Push Mura is caused. That is, the patterns of the upper substrate and the lower substrate are not aligned, and a light leakage region is occurred as indicated in dash line A1, thus the normal display for images is influenced. Not only the position but also the distribution density of the spacers have an effect on the quality of display. For example, when the distribution density of the spacers is too large, the amount of compression of the spacer is decreased. Because thermal expansion coefficients of the spacer and the liquid crystal are different, the thickness of the liquid crystal layer can not be controlled. Particularly, in the case of low temperature, the low-temperature bubbles are generated. When the liquid crystal display panel is placed perpendicularly, the liquid crystals may accumulate at a bottom of the liquid crystal display panel and the non-uniformity illumination is caused. Thus, the phenomenon of bottom expansion (also referred to as the Gravity Mura) is occurred.

On the other hand, if the distribution density of the column-shaped spacers is too small, the liquid crystal display panel can not have enough mechanical strength. When a pressure force is applied to the liquid crystal display panel perpendicularly, the cell gap changes because the liquid crystal display panel is pressed. The phenomenon of non-uniformity cell gap is occurred (hereinafter, referred to as the Press Mura). Therefore, it is necessary to arrange the column-shaped spacers with a suitable density.

FIG. 3 is a planar schematic diagram of another liquid crystal display panel illustrating arrangement for spacers. As illustrated in FIG. 3, two types of spacers are disposed on the liquid crystal display panel. The first spacer 30 and the second spacer 30' are respectively disposed above the scanning lines 12 with a certain ratio. FIG. 3a is cross-sectional diagram of the first spacer 30 of FIG. 3 taken along line B-B'. As illustrated in FIG. 3a, a dielectric layer 130 and a metal layer 40 are added on the scanning lines 12 corresponding to the first spacer 30. When the upper substrate and the lower substrate are vacuum sealed, the first spacer 30 may be pressed. Thus, the function of segregating and sealing the liquid crystal can be improved. In addition, when the liquid crystal display panel is placed perpendicularly, the liquid crystal can be prevented from accumulating at the bottom of the liquid crystal display panel. Thus, the Gravity Mura is alleviated. FIG. 3b is cross-sectional diagram of the second spacer 30' of FIG.

3 taken along line C-C'. As illustrated in FIG. 3b, the insulating layer 3 and the passivation layer 4 are configured on the scanning lines 12. A gap occurs between the second spacer 30' and the passivation layer 4 after the upper substrate and the lower substrate are vacuum sealed. When an external force is applied to the liquid crystal display panel, the upper substrate elasticly contacts the lower substrate, so that the phenomenon of the Press Mura can be reduced to a certain extent.

However, as can be known from the above analysis, when an external force in a transverse or a lateral direction is applied to the liquid crystal display panel, the spacer may still be moved. Therefore, it is inevitable that the phenomenon of the Push Mura occurs.

SUMMARY OF THE INVENTION

The present invention is to provide a liquid crystal display panel for efficiently reducing image display defects caused by the Gravity Mura, the Press Mura and the Push Mura.

An aspect of the present invention provides a liquid crystal display panel, including a first substrate; a second substrate opposite to the first substrate; a plurality of first, second and third spacers between the first substrate and the second substrate, the distribution density of the first spacers being larger than that of the second spacers and the distribution density of the third spacers being larger than that of the first spacers.

Another aspect of the present invention provides a liquid crystal display panel comprising a first substrate; a second substrate opposite to the first substrate; and two types of spacers disposed on the first substrate. One type of spacer is at least partially embedded into the second substrate and the other type of spacer is suspended above the second substrate. The distribution density of the suspended spacers is larger than that of the embedded spacers.

Another aspect of the present invention provides a liquid crystal display comprising a liquid crystal display panel, the liquid crystal display panel comprising a first substrate; a second substrate; and a plurality of first, second and third spacers disposed on the first substrate. The distribution density of the first spacers is larger than that of the second spacers and the distribution density of the third spacers is larger than that of the first spacers.

The liquid crystal display panel according to the present invention uses three types of spacers including the pressed spacer, the embedded spacer and the suspended spacer and optimizes distribution density of three types of spacers to make the three types of spacers functionate better. Thus, the Gravity Mura, the Push Mura and the Press Mura may be restrained, and a high display quality may be provided.

BRIEF DESCRIPTIONS OF THE DRAWINGS

Hereinafter, the above, other objects and advantages will become more apparent from the following description for embodiments of the present invention with reference to accompanying drawings. In the accompanying drawings, the identical parts are denoted with the same reference numerals. The accompanying drawings intend to illustrate the subject of the present invention and are not drawn to scale. For clarity, the thickness of layers and regions are amplified in the accompanying drawings.

FIG. 5 is a planar schematic diagram of a liquid crystal display panel according to a second embodiment of the present invention;

DETAILED DESCRIPTIONS OF THE EMBODIMENTS

Figure 1:
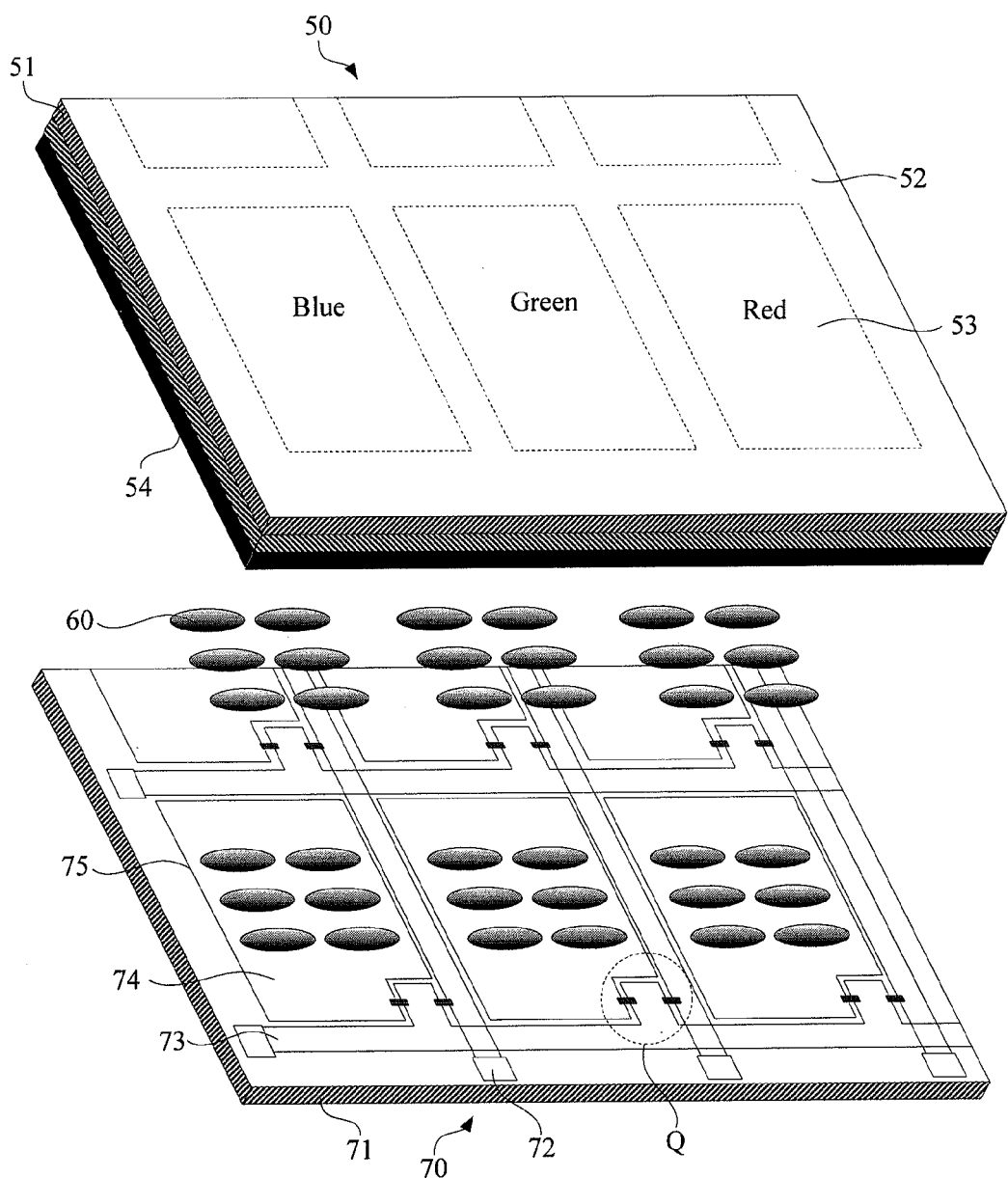
FIG. 1 is a exploded perspective diagram of a conventional liquid crystal display panel.
Figure 2:
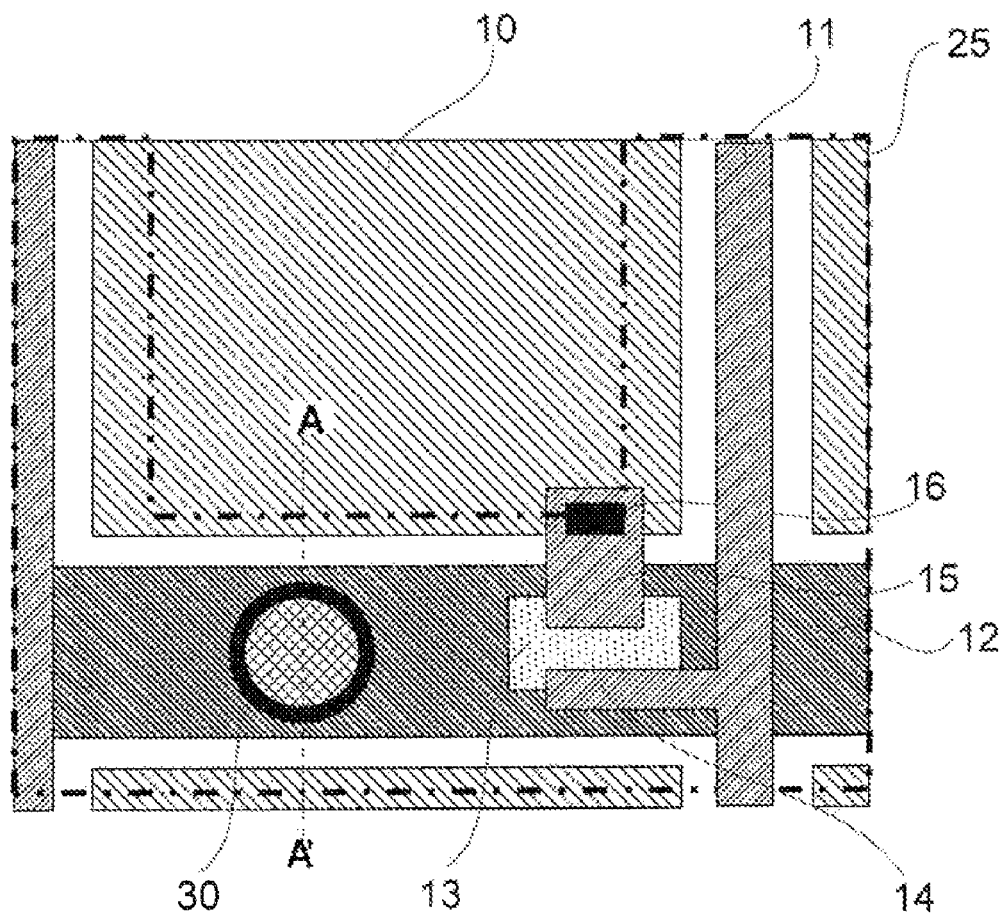
FIG. 2 is a planar schematic diagram of a liquid crystal display panel illustrating arrangement of a spacer.
Figure 2A:
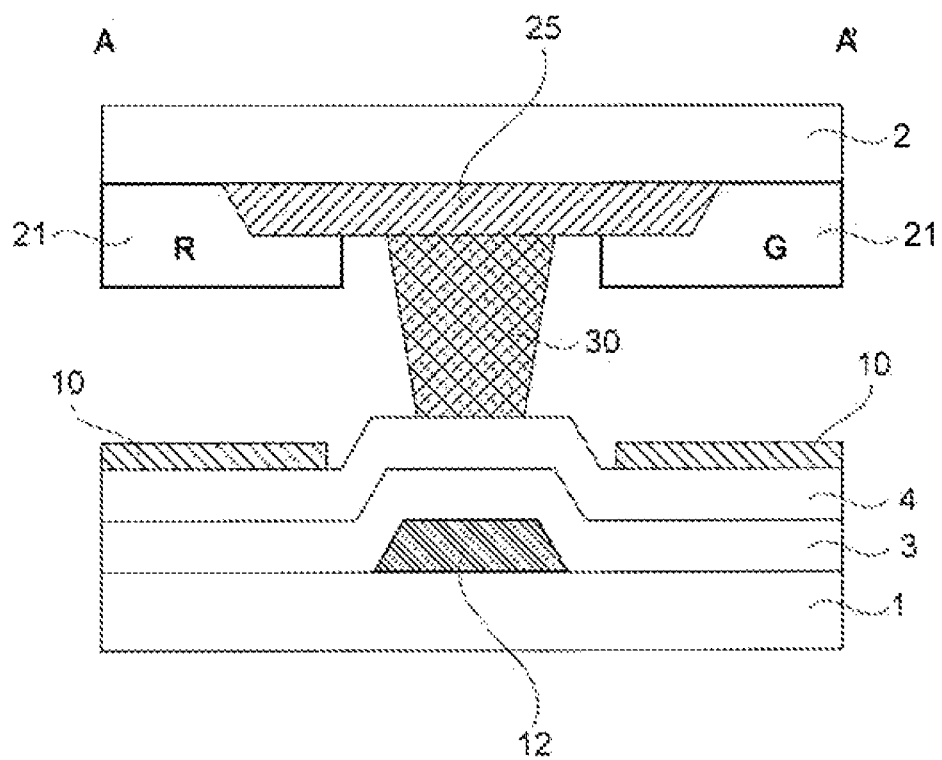
FIG. 2a is a cross-sectional diagram of the spacer of FIG. 2 taken along line A-A'.
Figure 2B:
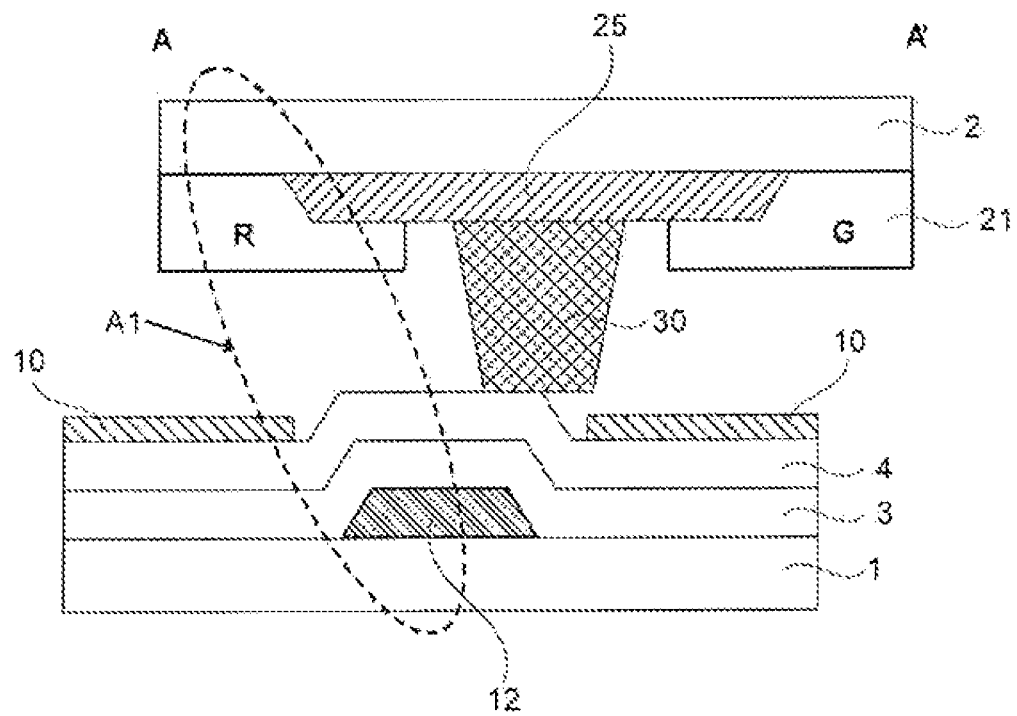
FIG. 2b is a schematic diagram of FIG. 2 illustrating that the spacer is moved by an external force.
Figure 3:
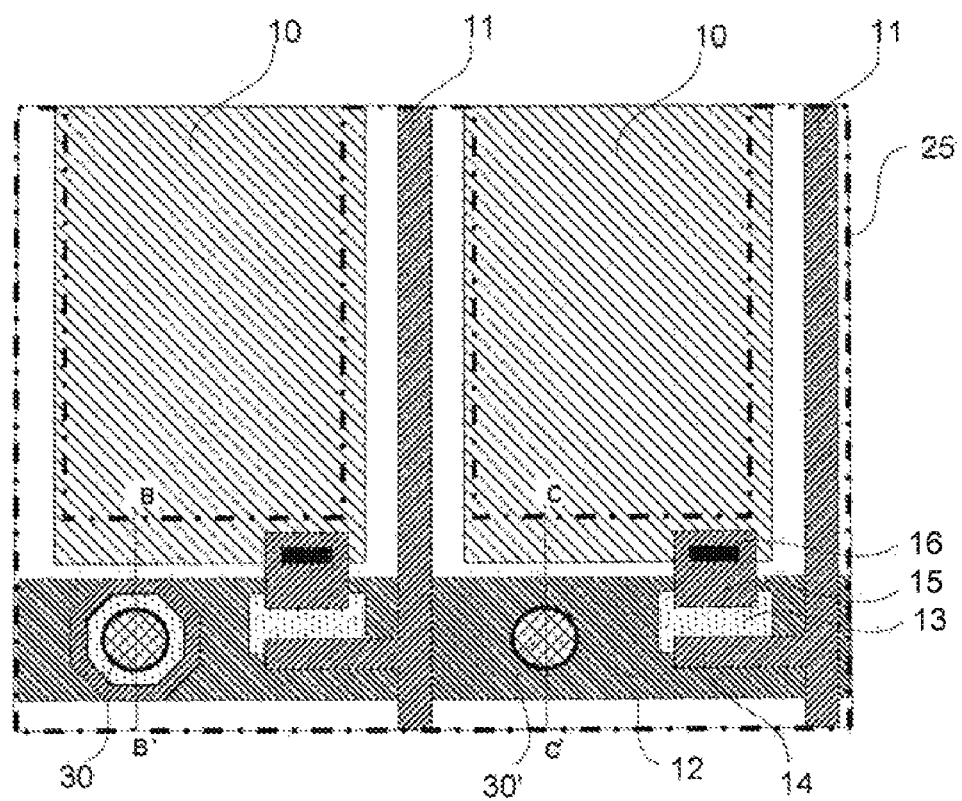
FIG. 3 is a planar schematic diagram of another liquid crystal display panel illustrating arrangement of spacers.
Figure 3A:
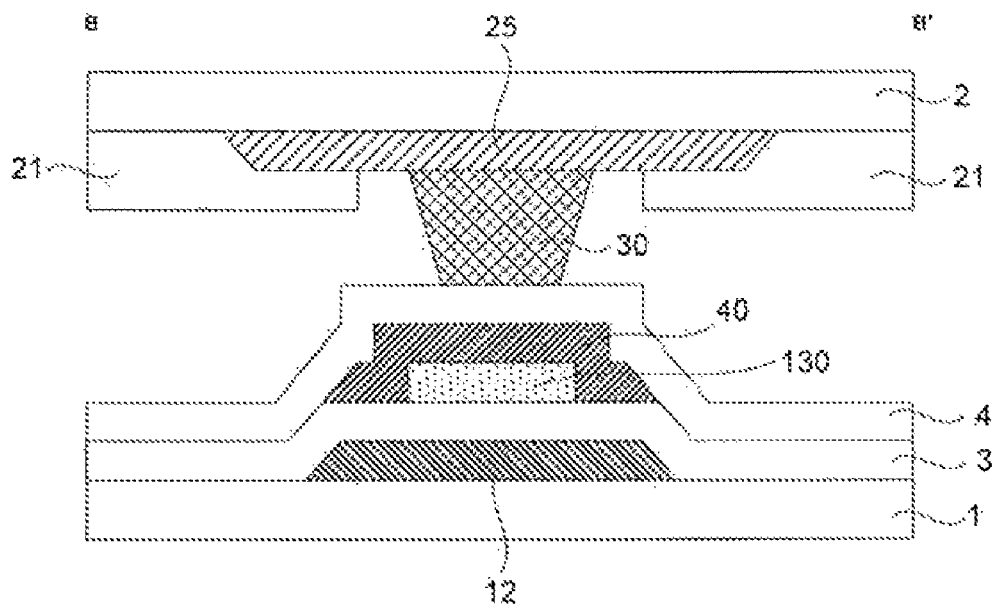
FIG. 3a is a cross-sectional diagram of a first spacer of FIG. 3 taken along line B-B'.
Figure 3B:
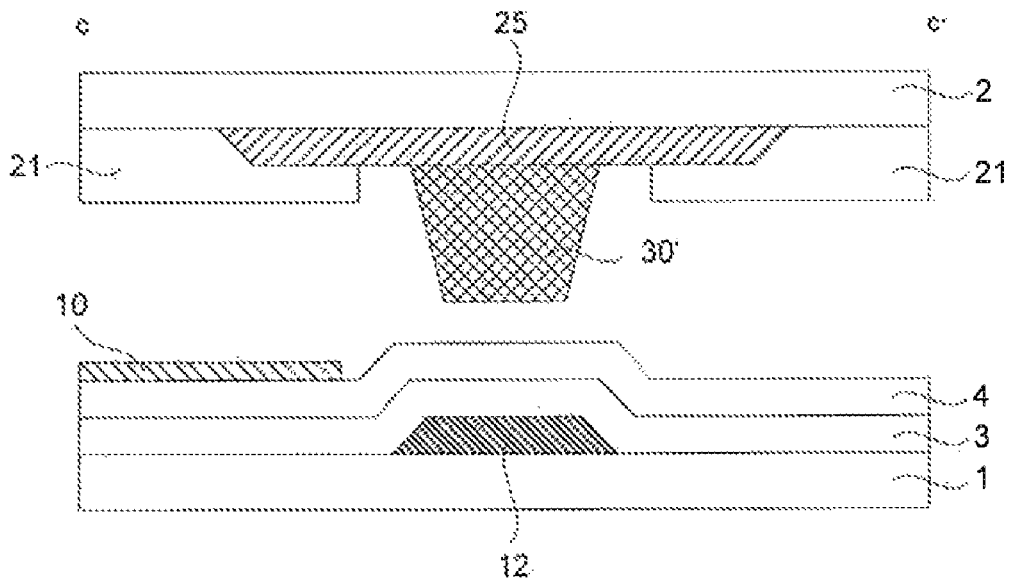
FIG. 3b is a cross-sectional diagram of a second spacer of FIG. 3 taken along line C-C'.

Hereinafter, in order to make the above objects, features and advantages to be easily understood, embodiments of the present invention will be described in detail with reference to the accompanying drawings.

A liquid crystal display panel according to the present invention provides three types of spacers including pressed spacers, embedded spacers and suspended spacers and optimizes the distribution densities of the three types of spacers to make the three types of spacers functionate better. The Gravity Mura, the Push Mura and the Press Mura can be inhibited by optimizing the distribution densities of the three types of spacers, and the display quality of the liquid crystal display panel can be improved.

While many specific details is described in the following of description so as to fully understand the present invention, it should be appreciated by those skilled in the art that the concept of the present invention may be implemented by various other embodiments that is different from the embodiment disclosed herein. Those skilled in the art can make equivalent constructions without departing from the spirit and scope of the invention as set forth in the appended claims. Therefore, the present invention is not limited to the disclosed embodiment below. In the embodiments of the present invention, the spacers are disposed under the common electrode layer. Because the common electrode layer is transparent and is disposed on the outermost layer of the upper substrate (that is, outside the black matrix and the color filter), the common electrode layer is not shown in the drawings for clarity.

Figure 4:
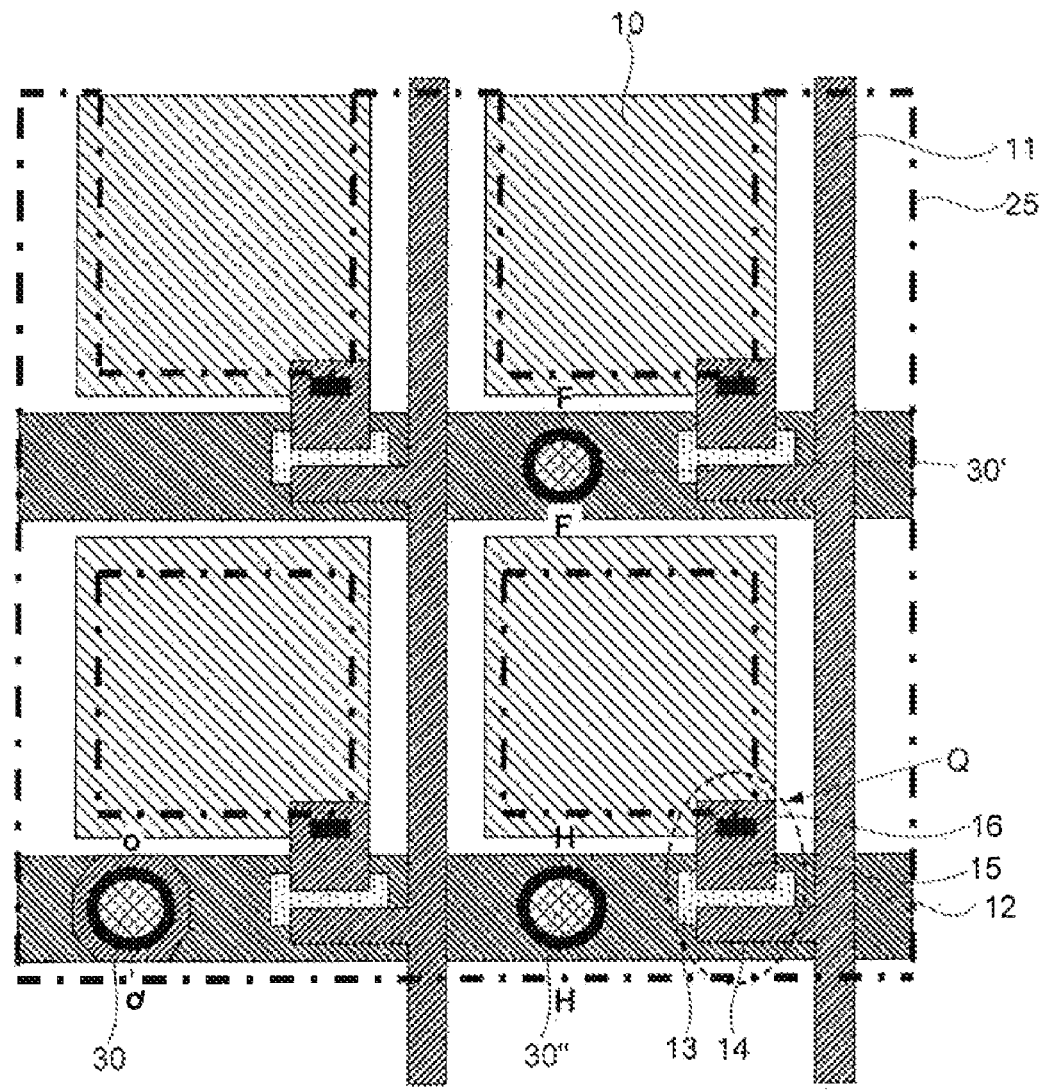
FIG. 4 is a planar schematic diagram of a liquid crystal display panel according to a first embodiment of the present invention.
Figure 4A:
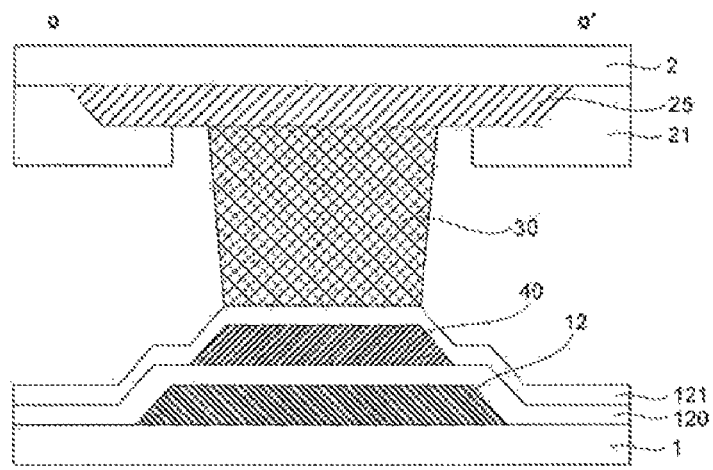
FIG. 4a is a cross-sectional diagram of a first spacer of FIG. 4 taken along line O-O'.
Figure 4B:
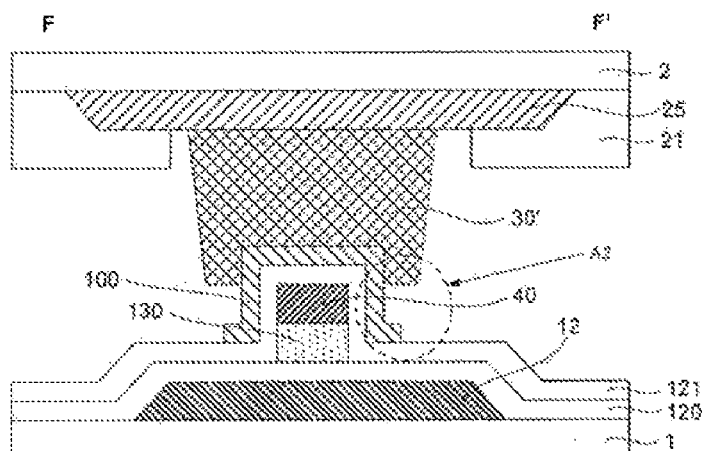
FIG. 4b is a cross-sectional diagram of a second spacer of FIG. 4 taken along line F-F'.
Figure 4C:
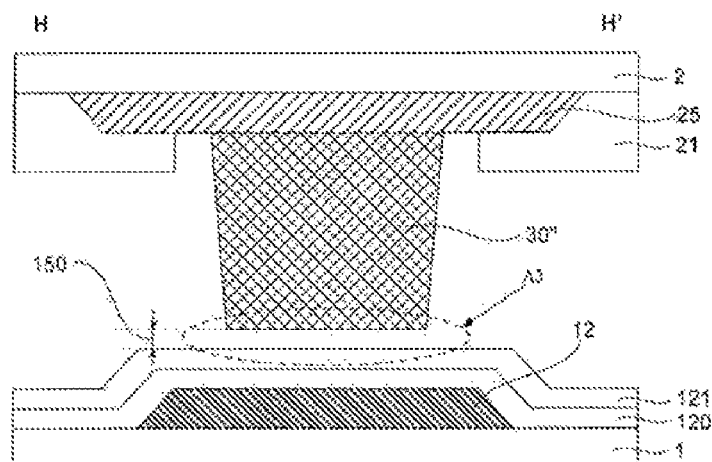
FIG. 4c is a cross-sectional diagram of a third spacer of FIG. 4 taken along line H-H'.

FIG. 4 is a planar schematic diagram of a liquid crystal display panel according to a first embodiment of the present invention. FIG. 4a is a cross-sectional diagram of a first spacer of FIG. 4 taken along line O-O'. FIG. 4b is a cross-sectional diagram of a second spacer of FIG. 4 taken along line F-F'. FIG. 4c is a cross-sectional diagram of a third spacer of FIG. 4 taken along line H-H'. The schematic diagrams are illustrative and can not limit the protection scope of the present invention.

In the liquid crystal display panel according to the first embodiment of the present invention, as illustrated in FIG. 4, the liquid crystal display panel includes an upper transparent substrate and a lower transparent substrate opposite to and insulated from the upper transparent substrate. A black matrix is configured in a surface of the upper substrate opposite to the lower substrate. The dash line block 25 of FIG. 4 shows the position of the black matrix of the upper substrate. The black matrix corresponding to a region between the pixel electrodes is adapted to prevent the light leakage. Signal lines, TFTs Q and pixel electrodes 10 are provided in a surface of the lower substrate opposite to the upper substrate. The signal lines include the data lines 11 for transmitting image data and the scanning lines 12 for transmitting control signals. The data lines 11 and the scanning lines 12 are perpendicularly disposed. The TFT Q includes an active layer 13, a source electrode 14, a drain electrode 15 and a gate electrode (not shown) corresponding to a part on the scanning line 12. The operation of the TFT Q is controlled by the scanning signal of the scanning lines 12. When the TFT is turned on, the TFT Q transmits the data signal from the data line 11 to the pixel electrode 10 via a through hole 16 so as to display the image signal.

The spacers are disposed between a common electrode outside of the black matrix 25 of the upper substrate and the scanning lines of the lower substrate. As illustrated in FIG. 4, a first spacer 30 at line O-O', a second spacer 30' at line F-F' and a third spacer 30" at line H-H' are configured to support the upper and the lower substrates so that a gap exists between the upper and the lower substrates. The gap is adapted to inject the liquid crystal. The spacers 30, 30' and 30" are disposed on a region of the liquid crystal display panel which does not affect the display of images, such as on the signal lines, i.e. on the data lines or the scanning lines. In the following embodiments of the present invention, the spacers disposed on the scanning lines are taken as an example.

The spacers of FIG. 4 includes the first spacer 30 at line O-O', the second spacer 30' at line F-F' and the third spacer 30" at line H-H' as shown in FIG. 4a, FIG. 4b and FIG. 4c respectively. The distribution density of the first spacers 30 is larger than that of the second spacers 30', and the distribution density of the third spacers 30" is larger than that of the first spacers 30. FIG. 4a is a cross-sectional diagram of the first spacer 30 of FIG. 4 taken along line O-O'. FIG. 4b is a cross-sectional diagram of the second spacer 30' of FIG. 4 taken along line F-F'. FIG. 4c is a cross-sectional diagram of the third spacer 30" of FIG. 4 taken along line H-H'.

As illustrated in FIG. 4a, the scanning lines 12 are disposed on the lower substrate 1. The black matrix 25 and the color filters 21 are formed on a surface of the upper substrate 2 opposite to the lower substrate 1. A transparent electrode (not shown), that is, a common electrode, is disposed on lower surfaces of the black matrix 25 and the color filters 21. A gate insulation layer 120, a metal layer 40 and a passivation layer 121 are respectively formed over the scanning lines 12. The gate insulation layer 120 is over the scanning lines 12. The metal layer 40 is located on the gate insulation layer 120. The passivation layer 121 is over the metal layer 40 and the gate insulation layer 120. The passivation layer 121 on the metal layer 40 is step-shaped. The first spacer 30 is under the common electrode (not shown). The first spacer 30, which is column-shaped, is formed on a lower surface of the common electrode by photolithograph process. The lower surface of the first spacer 30 which is column-shaped is in contact with a top step-shaped surface of the passivation layer 121. The area of the top step-shaped surface is larger than that of a low surface of the first spacer 30.

During the vacuum sealing for the liquid crystal display panel, when a space between the upper and the lower substrates decreases, the first spacer 30 is pressed due to the metal layer 40 and compression ratio of the first spacer 30 becomes larger. When the liquid crystal display panel is perpendicularly placed, the first spacer 30 can not be moved easily. In other words, the first type of spacer constituted by the first spacer 30 reduces occurrence of the Gravity Mura.

As illustrated in FIG. 4b, the scanning line 12 is formed on the lower substrate 1, and the black matrix 25 and the color filters 21 are on a surface of the upper substrate 2 opposite to the lower substrate 1. The transparent electrode (not shown), that is, the common electrode is disposed on lower surfaces of the black matrix 25 and the color filters 21. The second spacer 30' is formed on a lower surface of the common electrode by photolithograph process. The gate insulation layer 120 is formed over the scanning line 12 and has a step-shaped body formed on the scanning line 12. An amorphous silicon layer 130 is formed on the gate insulation layer 120. The material of the amorphous silicon layer 130 in the present embodiment is the same as that of the active layer, and is formed together with the active layer 13 of the TFT Q in the same process. A metal layer 40 is formed on the amorphous silicon layer 130, and a passivation layer 121 is formed over the amorphous silicon layer 130 and the metal layer 40. A pixel electrode layer 100 is formed over a part of the passivation layer 121. Therefore, a column-shaped protrusion is formed above the scanning line 12 at a position corresponding to the second spacer 30', in other words, the column-shaped protrusion is formed on the gate insulation layer 120. During the vacuum sealing for the liquid crystal display panel, when a space between the upper and the lower substrates decreases, a part of the column protrusion is embedded into the second spacer 30'. Region A2 in the FIG. 4b shows the state in which a part of the column-shaped protrusion is embedded into the second spacer 30'. Because a part of the column-shaped protrusion is embedded into the second spacer 30', the second spacer 30' is firmer. When an external force is applied to the liquid crystal display panel in parallel or with a certain angle, the second spacer 30' can not be moved. That is, the second type of spacer constituted by the second spacer 30' can efficiently reduce occurrence of the Push Mura.

As illustrated in FIG. 4c, the black matrix 25 and the color filters 21 are formed on a surface of the upper substrate 2 opposite to the lower substrate 1, and the transparent common electrode (not shown) is formed on lower surfaces of the black matrix 25 and the color filters 21. The scanning line 12 is formed on the lower substrate 1, and the gate insulation layer 120 is formed over the scanning line 12. The passivation layer 121 is formed over the gate insulation layer 120. The third spacer 30" is column-shaped and formed on a lower surface of the common electrode of the upper substrate. Only the gate insulation layer 120 and the passivation layer 121 are disposed between the third spacer 30" and the scanning line 12. During the vacuum sealing for the liquid crystal display panel, when a space between the upper and the lower substrates decreases, the third spacer 30" can not be in contact with the passivation layer 121 and a gap 150 as shown in region A3 of FIG. 4c can be formed between the third spacer 30" and the passivation layer 121. In addition, the area of a top step-shaped surface of the passivation layer 121 is larger than that of a lower surface of the third spacer 30".

When the liquid crystal display panel is pressed by an external force in perpendicular to the liquid crystal display panel, a lower surface of the third spacer 30" elastically contacts a top step surface of the passivation layer 121 due to the gap 150. When the press is released, the upper and the lower substrates can recover to an original state from a deformed state. In other words, the third type of spacer constituted by the third spacer 30" can effectively eliminate the Press Mura.

Herein, the spacers as shown in FIG. 4a, FIG. 4b and FIG. 4c are defined as the first spacer, the second spacer and the third spacer, respectively. The distribution densities of the three types of spacers between the upper and the lower substrates are configured as follows: the distribution density of the first spacers is larger than that of the second spacers and the distribution density of the third spacers is larger than that of the first spacers. The above distribution densities are adapted to make the three types of spacers functionate better so as to reduce occurrence of the Gravity Mura, the Push Mura and the Press Mura. When the liquid crystal display panel is pressed, the first spacer and the second spacer are compressed or may be damaged and not recovered to an original state. Only when the distribution density of the third spacers is largest, enough mechanical strength can be obtained to prevent the cell gap from changing in response to the pressure on the liquid crystal display panel. When the distribution density of the second spacers is larger than that of the first spacer, although the problem regarding the Push Mura is resolved, compression ratio of the first spacer is lowered. When the liquid crystal display device (liquid crystal display panel) is placed in perpendicular, the first spacer is far away from the passivation layer 121, and the liquid crystals accumulate at a bottom of the liquid crystal display panel due to gravity, thus the phenomenon of the Gravity Mura is bad. Therefore, the distribution density of the second spacers should be larger than that of the first spacers.

Figure 5A:
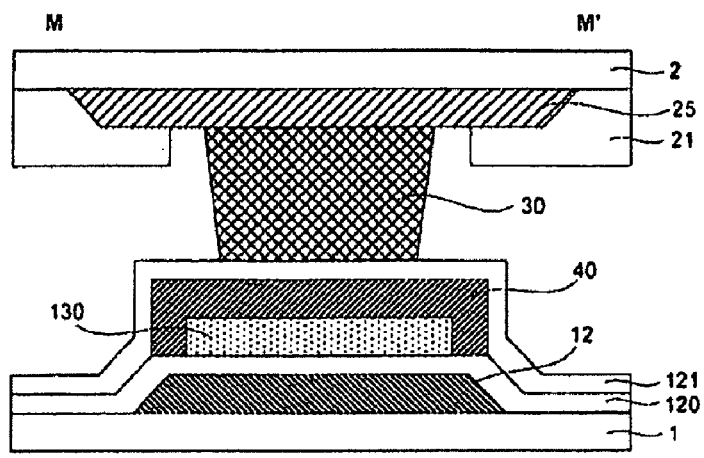
FIG. 5a is a cross-sectional diagram of a first spacer of FIG. 5 taken along line M-M'.
Figure 5B:
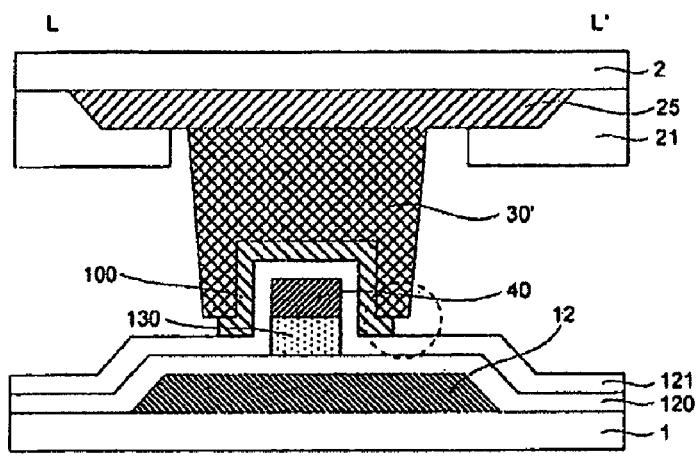
FIG. 5b is a cross-sectional diagram of a second spacer of FIG. 5 taken along line L-L'.
Figure 5C:
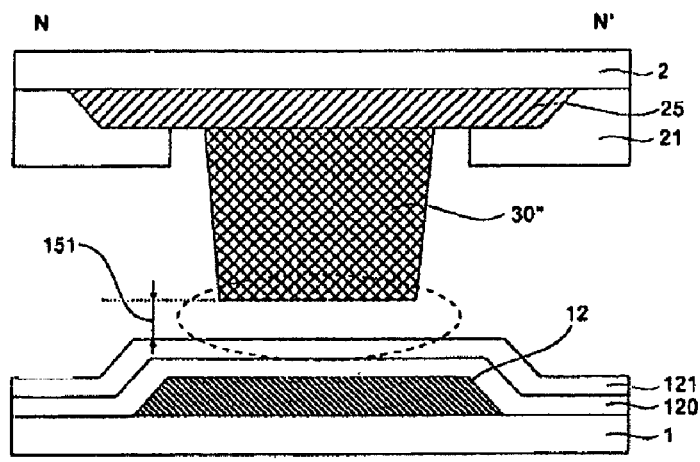
FIG. 5c is a cross-sectional diagram of a third spacer of FIG. 5 taken along line N-N'.

FIG. 5 is a planar schematic diagram of a liquid crystal display panel according to a second embodiment of the present invention. FIG. 5a is a cross-sectional diagram of a first spacer of FIG. 5 taken along line M-M'. FIG. 5b is a cross-sectional diagram of a second spacer of FIG. 5 taken along line L-L'. FIG. 5c is a cross-sectional diagram of a third spacer of FIG. 5 taken along line N-N'. The schematic diagrams are illustrative and can not limit the protection scope of the present invention.

The liquid crystal display panel according to the second embodiment of the present invention as shown in FIG. 5 is the same as that in FIG. 4 except that spacers are different, so that the repeated explanations for the same structure between FIG. 5 and FIG. 4 will be omitted. The spacers in FIG. 5 include the first spacer 30 at line M-M', the second spacer 30' at line L-L' and the third spacer 30" at line N-N', as illustrated in FIGS. 5a, 5b and 5c, respectively. Further, the distribution density of the first spacers 30 is larger than that of the second spacers 30', and the distribution density of the third spacers 30" is larger than that of the first spacers 30.

As illustrated in FIG. 5a, the scanning lines 12 are disposed on the lower substrate 1, and the black matrix 25 and the color filters 21 are formed on a surface of the upper substrate 2 opposite to the lower substrate 1. The transparent common electrode (not shown) is disposed on lower surfaces of the black matrix 25 and the color filters 21. A gate insulation layer 120 is formed over the scanning lines 12. An amorphous silicon layer 130 is formed on the gate insulation layer 120. A metal layer 40 is formed over the amorphous silicon layer 130. A passivation layer 121 is formed over the metal layer 40 and the gate insulation layer 120, thus a step-shaped body as shown in FIG. 5a is formed. The first spacer 30 is formed on the lower surface of the common electrode with the photolithograph process. The area of a surface of the step-shaped body (an upper surface of the passivation layer 121) is far larger than that of the lower surface of the first spacer 30. During the vacuum sealing for the liquid crystal display panel, when the space between the upper and the lower substrates decreases, the first spacer 30 is pressed due to the metal layer 40 and the amorphous silicon layer 130. The first spacer is further pressed and the compression ratio of the first spacer 30 becomes larger. When the panel is perpendicularly disposed, the first spacer 30 can not be moved easily. Thus, the occurrence of the Gravity Mura can be further reduced.

As illustrative in FIG. 5b, the column-shaped protrusion which is the same as that in FIG. 4b is formed on the gate insulation layer 120. The column-shaped protrusion includes the amorphous silicon layer 130, the metal layer 40, the passivation layer 121 and the pixel electrode layer 100 partially covering the passivation layer 120. The difference between the column-shaped protrusions shown in FIGS. 4b and 5b lies in that the thickness of the amorphous silicon layer 130 of FIG. 5b is increased. The column-shaped second spacer 30' is formed on the lower surface of the common electrode with the photolithography process. During the vacuum sealing for the liquid crystal display panel, when the space between the upper and the lower substrates decreases, a part of the column-shaped protrusion is embedded into the second spacer 30' more deeply. As illustrated in region A4 of FIG. 5b, a lower surface of the second spacer 30' contacts with an upper surface of a lower part of the pixel electrode 100. Therefore, the second spacer 30' is more firm due to the deeper embedment of the column-shaped protrusion. When an external force is applied to the liquid crystal display panel in parallel or with a certain angle, the second spacer 30' can not be moved, so that the occurrence of the push mura can be further reduced.

As illustrated in FIG. 5c, the black matrix 25 and the color filters 21 are formed on a surface of the upper substrate 2 opposite to the lower substrate 1. The scanning line 12 is disposed on the lower substrate 1, and the gate insulation layer 120 is disposed on the scanning line 12. The passivation layer 121 is formed over the gate insulation layer 120. The third spacer 30" is column-shaped and formed on the lower surface of the common electrode of the upper substrate. Only the gate insulation layer 120 and the passivation layer 121 are disposed between the third spacer 30" and the scanning line 12. In this embodiment, a gap 151 between the third spacer 30" and the passivation layer 121 as shown in region A5 of FIG. 5c, is larger than the gap 150 as shown in FIG. 4c. Thus, a space between the third spacer 30" and the passivation layer 121 is larger. Therefore, after the vacuum sealing is performed for the liquid crystal display panel, when an external pressure force is applied on the liquid crystal display panel in perpendicular, the elastic path between the lower surface of the third spacer 30" and the top step surface of the passivation layer 121 increases due to the gap 151. When the pressure force is removed, the upper and the lower substrates can recover to an original state from a deformed state. In other words, the Press Mura is effectively eliminated.

Here, the spacers as shown in FIGS. 5a, 5b and 5c are defined as a first spacer, a second spacer and a third spacer, respectively. The distribution densities between the upper and the lower substrates for three types of spacers are configured as follows: the distribution density of the first spacers is larger than that of the second spacers and the distribution density of the third spacers is larger than that of the first spacers. The above distribution densities are adapted to make the three types of spacers functionate better so as to reduce the occurrence of the Gravity Mura, the Push Mura and the Press Mura. The principle is the same as that of the first embodiment, and repeated descriptions thereof are omitted hereinafter.

Figure 6:
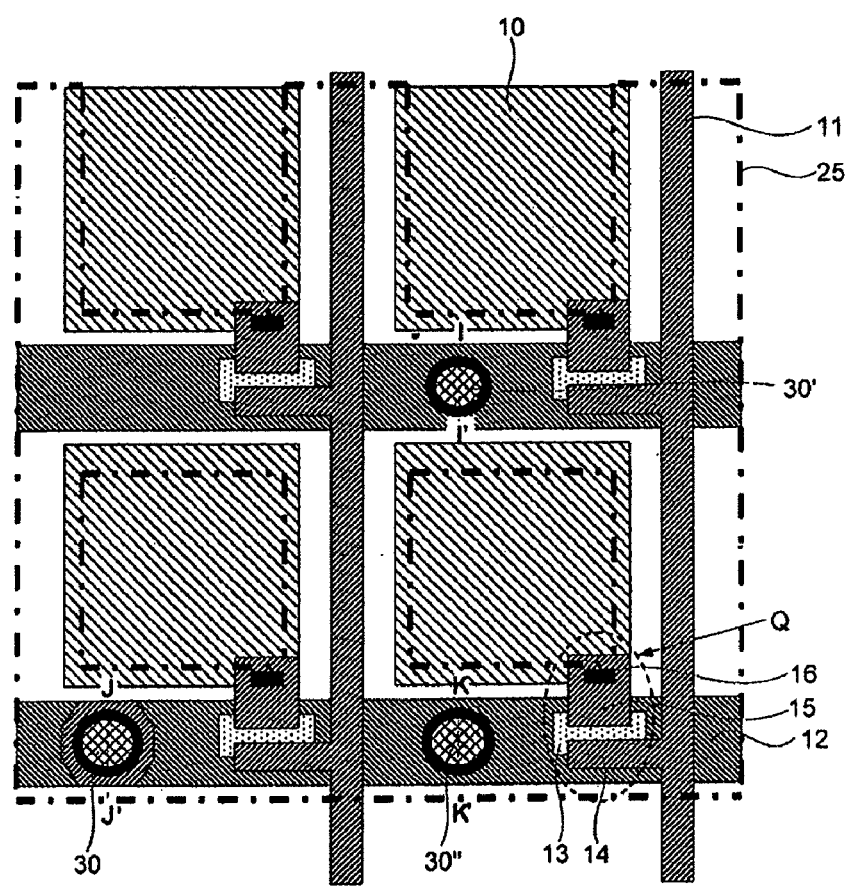
FIG. 6 is a planar schematic diagram of a liquid crystal display panel according to a third embodiment of the present invention.
Figure 6A:
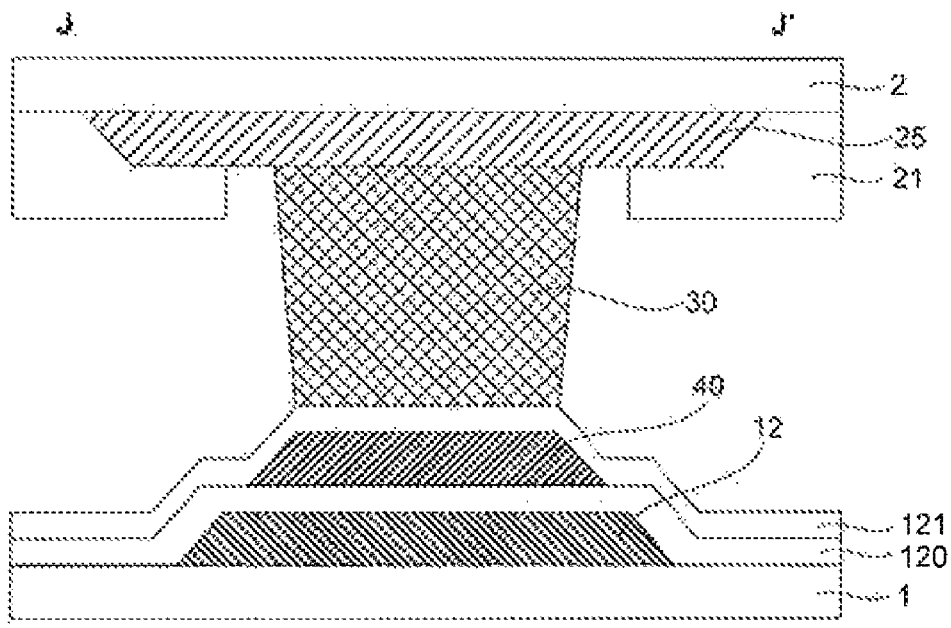
FIG. 6a is a cross-sectional diagram of a first spacer of FIG. 6 taken along line J-J'.
Figure 6B:
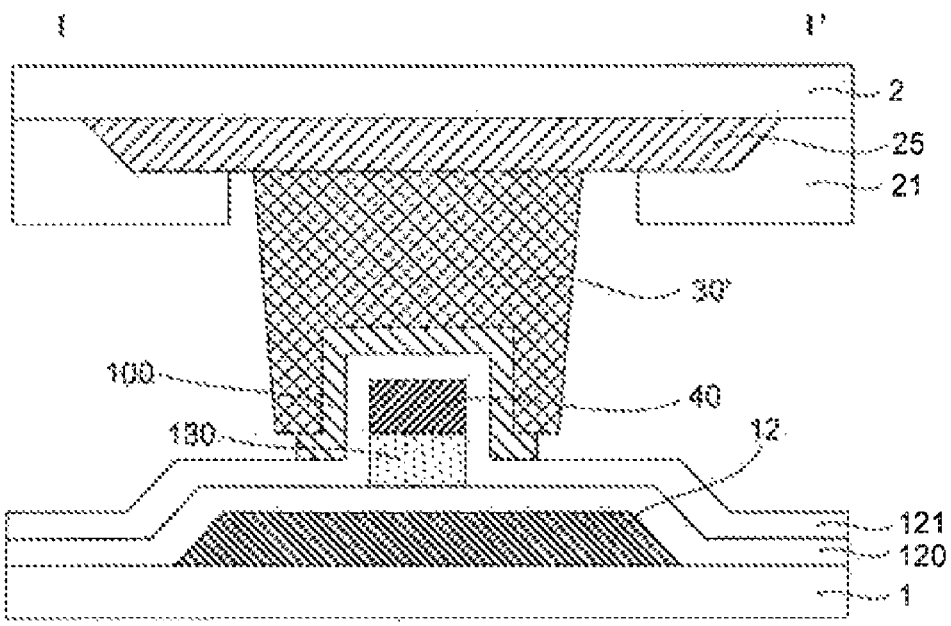
FIG. 6b is a cross-sectional diagram of a second spacer of FIG. 6 taken along line I-I'.
Figure 6E:
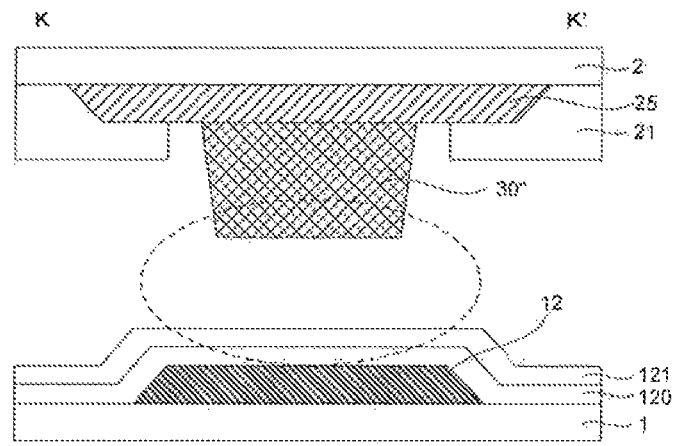
FIG. 6c is a cross-sectional diagram of a third spacer of FIG. 6 taken along line K-K'.

FIG. 6 is a planar diagram of a liquid crystal display panel according to a third embodiment of the present invention. FIG. 6a is a cross-sectional diagram of a first spacer of FIG. 6 taken along line J-J'. FIG. 6b is a cross-sectional diagram of a second spacer of FIG. 6 taken along line I-I'. FIG. 6c is a cross-sectional diagram of a third spacer of FIG. 6 taken along line K-K'. The schematic diagrams are illustrative and can not limit the protection scope of the present invention.

The liquid crystal display panel according to the third embodiment of the present invention as shown in FIG. 6 is the same as that in FIG. 4 except for the spacers, so that the repeated explanations for the same structure will be omitted. The spacers in FIG. 6 includes the first spacer 30 at line J-J', the second spacer 30' at line I-I', the third spacer 30" at line K-K as illustrated in FIGS. 6a, 6b and 6c, respectively. Further, the distribution density of the first spacers 30 is larger than that of the second spacers 30', and the distribution density of the third spacers 30" is larger than that of the first spacers 30.

The first spacer 30 as illustrated in FIG. 6a is the same as the first spacer 30 as shown in FIG. 4a. The second spacer 30' as shown in FIG. 6b is the same as the second spacer 30' as shown in FIG. 5b. In present embodiment, the third spacer 30" as shown in FIG. 6c is formed with the half tone technology. That is, for the lower surface of the common electrode, the third spacer 30' is illuminated partly, while the first spacer 30 and the second spacer 30' are fully illuminated. The thickness of the formed third spacer 30' is decreased significantly, compared with the first spacer 30 and the second spacer 30'. Thus, a larger gap is formed between the third spacer 30" and the passivation layer 121. The third spacer 30" is suspended above the passivation layer 121. In this way, the sufficient mechanical strength is provided to prevent the cell gap from changing in response to the pressure on the liquid crystal display panel.

Figure 7:
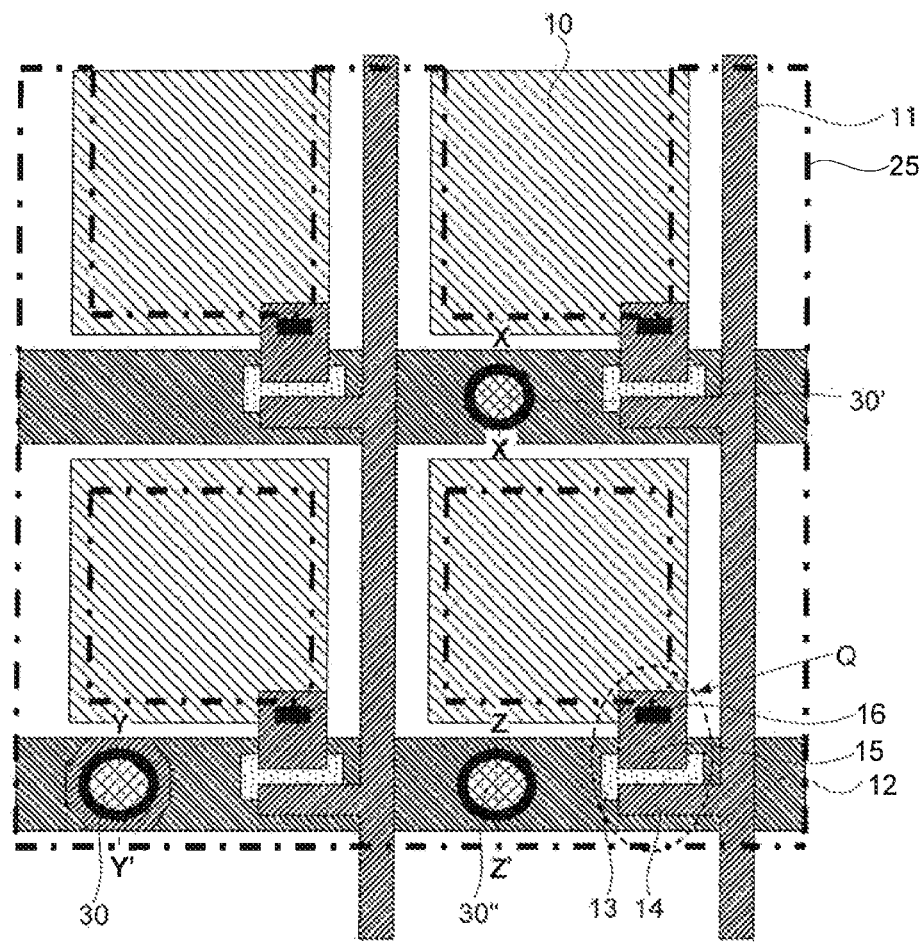
FIG. 7 is a planar schematic diagram of a liquid crystal display panel according to a fourth embodiment of the present invention.
Figure 7A:
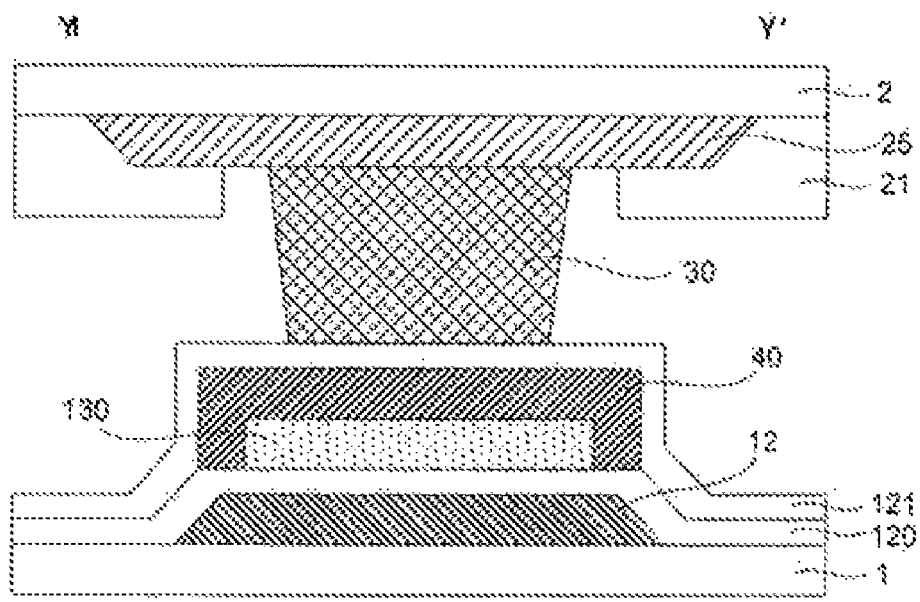
FIG. 7a is a cross-sectional diagram of a first spacer of FIG. 7 taken along line Y-Y'.
Figure 7B:
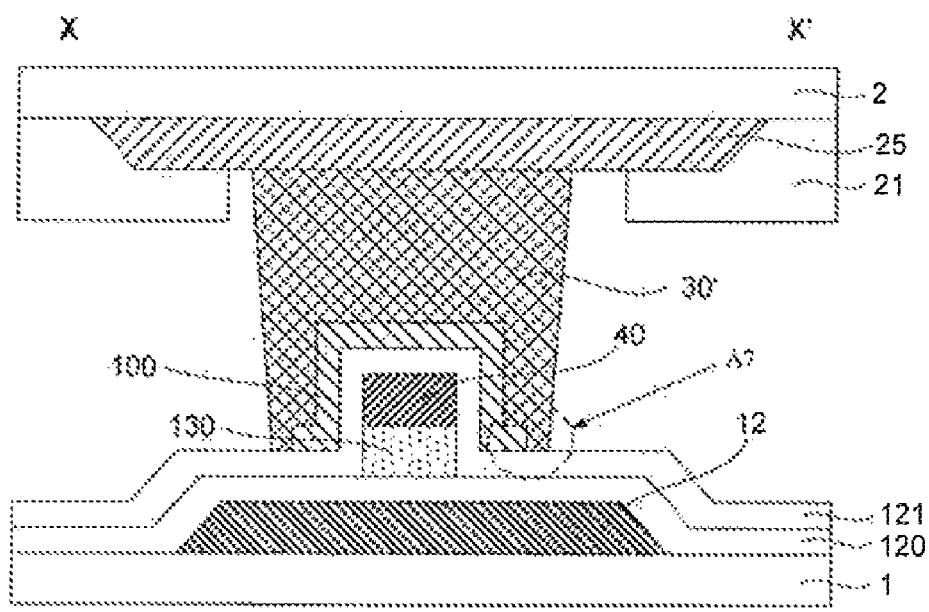
FIG. 7b is a cross-sectional diagram of a second spacer of FIG. 7 taken along line X-X'.
Figure 7C:
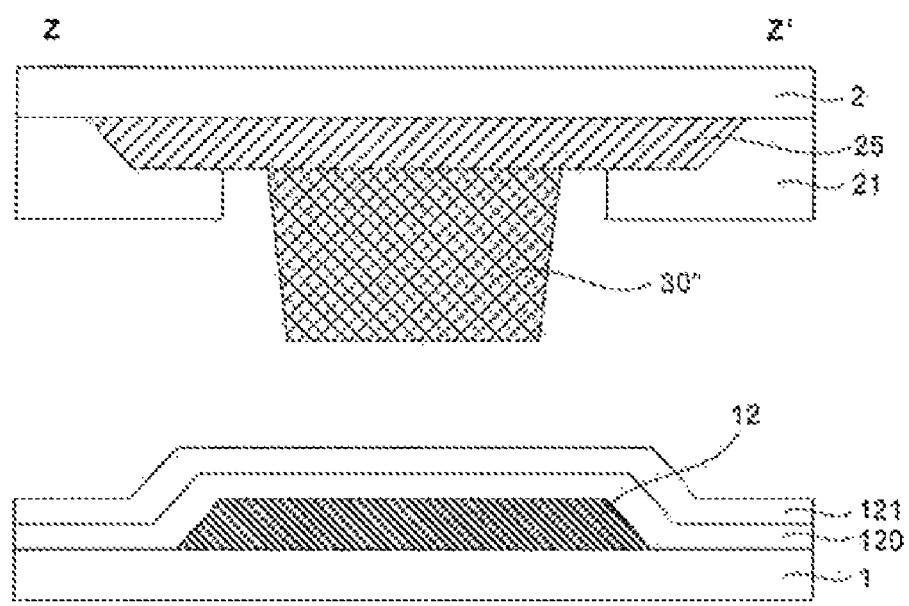
FIG. 7c is a cross-sectional diagram of a third spacer of FIG. 7 taken along line Z-Z'.

FIG. 7 is a planar diagram of a liquid crystal display panel according to a fourth embodiment of the present invention. FIG. 7a is a cross-sectional diagram of a first spacer of FIG. 7 taken along line Y-Y'. FIG. 7b is a cross-sectional diagram of a second spacer of FIG. 7 taken along line X-X'. FIG. 7c is a cross section diagram of a third spacer of FIG. 7 taken along line Z-Z'. The schematic diagrams are illustrative and can not limit the protection scope of the present invention.

The liquid crystal display panel according to the fourth embodiment of the present invention as shown in FIG. 7 is the same as that in FIG. 4 except for the spacers, so that the repeated explanations for the same structure will be omitted. The spacers in FIG. 7 include the first spacer 30 at line Y-Y', the second spacer 30' at line X-X' and the third spacer 30" at line Z-Z', as shown in FIGS. 7a, 7b and 7c, respectively.

Further, the distribution density of the first spacers 30 is larger than that of the second spacers 30', and the distribution density of the third spacers 30" is larger than that of the first spacers.

The first spacer 30 as shown in FIG. 7a is the same as the first spacer 30 as shown in FIG. 5a. As shown in FIG. 7b, the thickness of the amorphous silicon layer 130 in the column-shaped protrusion is increased so that the column-shaped protrusion is completely embedded into the second spacer 30' (refer to region A7) when the upper and lower substrates are sealed. Thus, the second spacer 30' becomes more stable and the occurrence of the Push Mura is further reduced. In this embodiment, the third spacer 30" in FIG. 7c is the same as that in FIG. 6c, and is also formed with the halftone technology. The thickness of the formed third spacer 30" is decreased significantly, and a larger gap between the surfaces of the third spacer 30" and the passivation layer 121 is formed, compared with the first and the second embodiments. Thus, the sufficient mechanical strength is provided to prevent the cell gap from changing in response to the pressure on the liquid crystal display panel.

In the second and third embodiments, the thickness of the amorphous silicon layer 130 may also be increased so that the column-shaped protrusion is completely embedded into the first spacer 30 when the upper and lower substrates are sealed. Thus, the first spacer 30 become more stable and the occurrence of the push mura is further reduced.

Another embodiment of the present invention provides a liquid crystal display panel. The liquid crystal display panel only includes the second spacer 30' and the third spacer 30". The distribution density of the second spacers 30' is smaller than that of the third spacers 30". Other structures of this panel are the same as those of the above panels and repeated descriptions are omitted. For example, the second spacer 30' can be an embedded structure as shown in FIGS. 4b, 5b and 7b. The second spacer 30' can be a suspended structure formed by the half tone technology as shown in FIGS. 6c and 7c.

The forgoing descriptions disclose preferred embodiments of the present invention and do not intend to limit the present invention. Additional advantages and modifications will readily occur to those skilled in the art. Therefore, the invention in its broader aspects is not limited to the specific details and representative embodiments shown and described herein. Accordingly, various modifications and variations may be made without departing from the scope of the invention as defined by the appended claims and their equivalents.

What is claimed is:

1. A liquid crystal display panel comprising:
   a first substrate;
   a second substrate opposite to the first substrate; and
   a plurality of first, second and third spacers disposed on the first substrate;
   wherein one of the first spacers is in contact with the second substrate, a protrusion on the second substrate is at least partially embedded into one of the second spacers so that the one second spacer cannot be moved when an external force is applied to the liquid crystal display panel in parallel or with a certain angle, and one of the third spacers is suspended above the second substrate,
   wherein the protrusion is disposed on a gate insulation layer of the second substrate, and the protrusion comprises: an amorphous silicon layer formed on the gate insulation layer, a metal layer formed on the amorphous silicon layer, a passivation layer covering the amorphous silicon layer and metal layer, and a pixel electrode layer partially covering the passivation layer, and wherein a first distribution density of the first spacers is larger than that of the second spacers and an additional distribution density of the third spacers is larger than that of the first spacers.

2. The liquid crystal display panel according to claim 1, wherein the one first spacer is in contact with a step-shaped body disposed on the second substrate, and an area of an upper surface of the step-shaped body is larger than that of a lower surface of the one first spacer.

3. The liquid crystal display panel according to claim 2, wherein the step-shaped body comprises a gate insulation layer, a metal layer and a passivation layer in sequence disposed on a scanning line of the second substrate.

4. The liquid crystal display panel according to claim 2, wherein the step-shaped body comprises a gate insulation layer, an amorphous silicon layer, a metal layer and a passivation layer in sequence disposed on a scanning line of the second substrate.

5. The liquid crystal display panel according to claim 1, wherein a gate insulation layer and a passivation layer covering the gate insulation layer are in sequence disposed on a scanning line of the second substrate.

6. The liquid crystal display panel according to claim 5, wherein the one third spacer is suspended above the passivation layer.

7. The liquid crystal display panel according to claim 6, wherein a height of the one third spacer is less than that of the one first spacer and the one second spacer.

8. A liquid crystal display panel comprising:
a first substrate;
a second substrate opposite to the first substrate; and
two types of spacers disposed on the first substrate;
wherein one type of spacer is at least partially embedded into the second substrate and the other type of spacer is suspended above the second substrate; and the distribution density of the suspended spacers is larger than that of the embedded spacers; and
wherein a scanning line, a gate insulation layer, an amorphous silicon layer, a metal layer, a passivation layer and a pixel electrode layer are in sequence disposed on the second substrate corresponding to the embedded spacer.

9. The liquid crystal display panel according to claim 8, wherein the embedded depth of the embedded spacer depends on the thickness of the amorphous silicon layer.

10. The liquid crystal display panel according to claim 8, wherein a scanning line, a gate insulation layer and a passivation layer are in sequence disposed on the second substrate corresponding to the suspended spacer.

11. A liquid crystal display panel comprising:
a first substrate;
a second substrate opposite to the first substrate; and
a plurality of first, second and third spacers disposed between the first substrate and the second substrate;
wherein a first distribution density of the first spacers is larger than that of the second spacers and an additional distribution density of the third spacers is larger than that of the first spacers;
wherein the plurality of the first spacers, the second spacers and the third spacers are disposed on the first substrate;
wherein a protrusion is disposed on a gate insulation layer of the second substrate, and the protrusion is at least partially embedded into a first one of the second spacers; and
wherein the protrusion comprises: an amorphous silicon layer formed on the gate insulation layer, a metal layer formed on the amorphous silicon layer, a passivation layer covering the amorphous silicon layer and metal layer, and a pixel electrode layer partially covering the passivation layer.

* * * * *